United States Patent [19]
Pollman

[11] Patent Number: 5,560,203
[45] Date of Patent: Oct. 1, 1996

[54] TRANSMISSION CONTROL SYSTEM AND METHOD

[75] Inventor: Frederic W. Pollman, Eden Prairie, Minn.

[73] Assignee: Sauer Inc., Ames, Iowa

[21] Appl. No.: 409,324

[22] Filed: Mar. 23, 1995

[51] Int. Cl.⁶ ............................ F16D 31/00; F16H 47/00
[52] U.S. Cl. .................. 60/327; 60/420; 60/448; 60/449; 60/452; 477/20
[58] Field of Search .................... 60/420, 327, 435, 60/443, 445, 446, 447, 448, 449, 450, 451, 452, 487, 441, 490; 91/505; 477/20; 74/732

[56] References Cited

U.S. PATENT DOCUMENTS

| | | | |
|---|---|---|---|
| 3,053,043 | 9/1962 | Knowler | 60/441 X |
| 4,028,890 | 6/1977 | Habiger et al. | 60/443 |
| 4,180,981 | 1/1980 | Pensa | 60/435 |
| 4,246,806 | 1/1981 | Reynolds et al. | 74/687 |
| 4,594,666 | 6/1986 | Cornell | 364/424 |
| 4,598,545 | 7/1986 | Harada | 60/435 |
| 4,648,040 | 3/1987 | Cornell et al. | 364/424 |
| 4,663,714 | 5/1987 | Cornell et al. | 364/424 |
| 4,672,811 | 6/1987 | Yoshida et al. | 60/445 X |
| 5,136,495 | 8/1992 | Tokoro et al. | 364/424 |
| 5,161,433 | 11/1992 | Sakakibara et al. | 74/866 |
| 5,184,466 | 2/1993 | Schniederjan et al. | 60/448 |
| 5,213,012 | 5/1993 | Suzuki | 74/866 |
| 5,240,094 | 8/1993 | Suzuki | 192/4 A |
| 5,285,389 | 2/1994 | Taylor | 364/424 |
| 5,295,795 | 3/1994 | Yasuda et al. | 60/445 X |
| 5,337,629 | 8/1994 | Kita | 477/52 |

*Primary Examiner*—Hoang Nguyen
*Attorney, Agent, or Firm*—Zarley, McKee, Thomte, Voorhees, & Sease

[57] ABSTRACT

A hydromechanical transmission shifting control system and method includes a hydromechanical transmission and a number of clutches connected to the transmission. A microcontroller receives various signals generated by the operator, engine, transmission, and the load. The microcontroller controls the ratio of the input to output speed of the transmission as well as the engagement or disengagement of the number of clutches based upon the various input signals.

24 Claims, 4 Drawing Sheets

5,560,203

TRANSMISSION CONTROL SYSTEM AND METHOD

BACKGROUND OF THE INVENTION

1. Field of the Invention

The present invention relates to a hydromechanical transmission shifting control system. More particularly, the present invention relates to a hydromechanical transmission shifting control system having a variable displacement component of a hydrostatic unit and a set of clutches which are controlled by a microcontroller which senses various conditions.

2. Problems in the Art

Hydromechanical transmission control systems are known in the art. A hydromechanical transmission has the ability to have a continuously variable ratio coverage over a wide torque and speed range. As a result, vehicle operating characteristics at the output or at the engine can be improved. For example, a transmission control system can be used to obtain maximum power for acceleration, optimum fuel economy, or a fixed output speed control. Typically, prior transmission control systems use a number of hydraulic logic valves to accomplish the control requirements. While these systems are able to control the hydromechanical transmission, they have disadvantages including inflexibility, high cost, complexity, etc.

FEATURES OF THE INVENTION

A primary feature of the present invention is the provision of a hydromechanical transmission control system and method which controls a continuously variable transmission in the manner which best suits the needs of the user.

A further feature of the present invention is the provision of a hydromechanical transmission shifting control system which integrates the engine, transmission, and load system together.

A further feature of the present invention is the provision of a hydromechanical transmission shifting control system which may use a microcontroller that receives signals from the engine, operator, transmission, and the load to control the transmission.

A further feature of the present invention is the provision of a hydromechanical transmission shifting control system which controls a plurality of clutches connected to the hydromechanical transmission.

These as well as other features of the present invention will become apparent from the following specification and claims.

SUMMARY OF THE INVENTION

A transmission shifting control system of the present invention includes a hydromechanical transmission having an input and output shaft, a plurality of clutches connected to the transmission, and a microcontroller for controlling the ratio of the output shaft to the input shaft and the selection of the various clutches.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalences which may be included within the spirit and scope of the invention.

Figure 1:
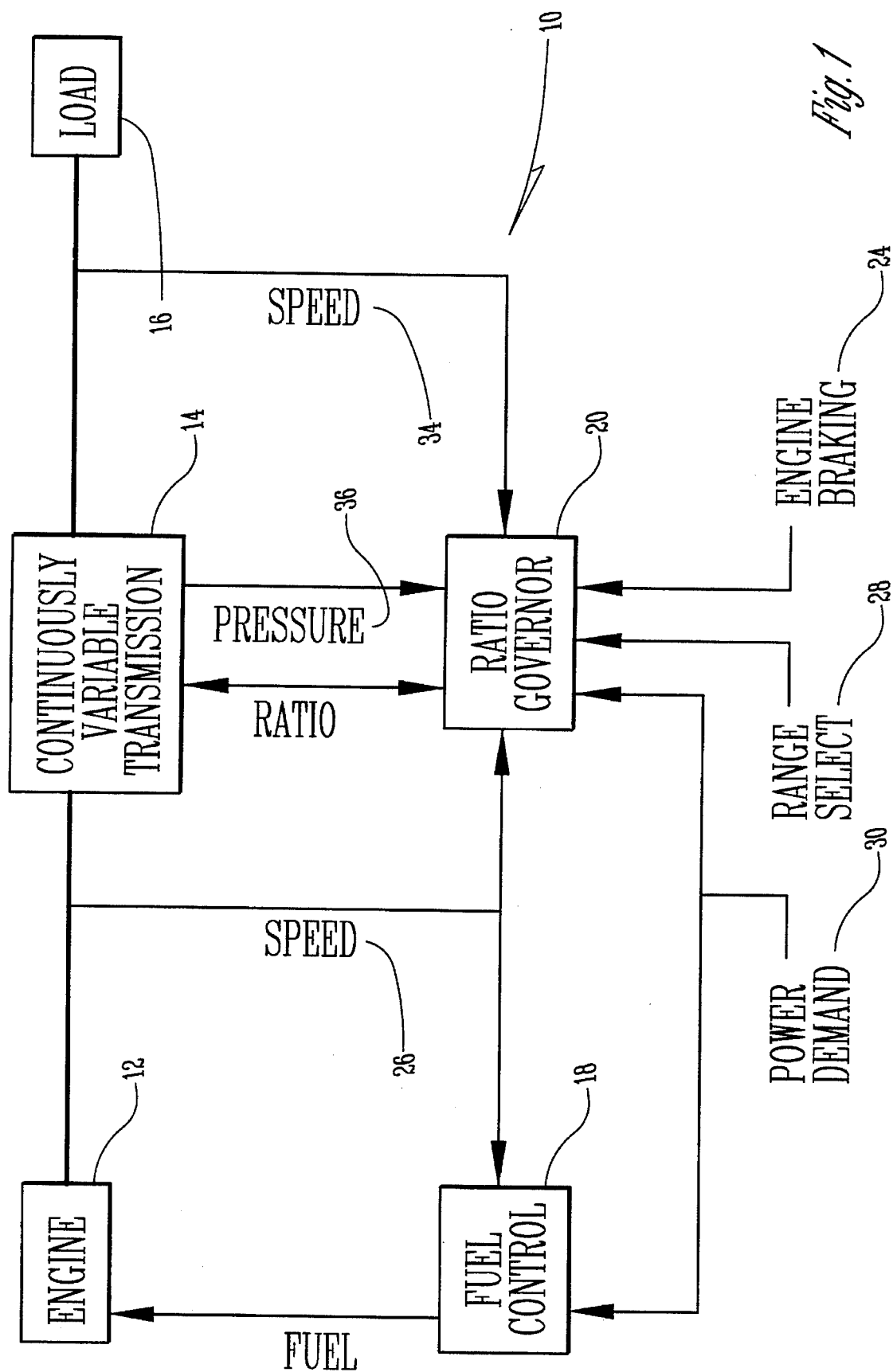
FIG. 1 is a block diagram showing a continuously variable transmission control system which integrates the engine, transmission, and load system together.

FIG. 1 shows a block diagram of a variable transmission control system 10 which integrates the engine 12, continuously variable transmission 14, and load 16 together. The system 10 also includes a fuel control portion 18 and a ratio governor portion 20 that is discussed below. The elements shown in FIG. 1 are linked together by control signals. The transmission control system 10 uses input signals taken from various sources to control the transmission 14. A system such as that shown could be used on a vehicle equipped with a continuous variable transmission to control the transmission in a manner which best suits the need of the user.

Figure 2:
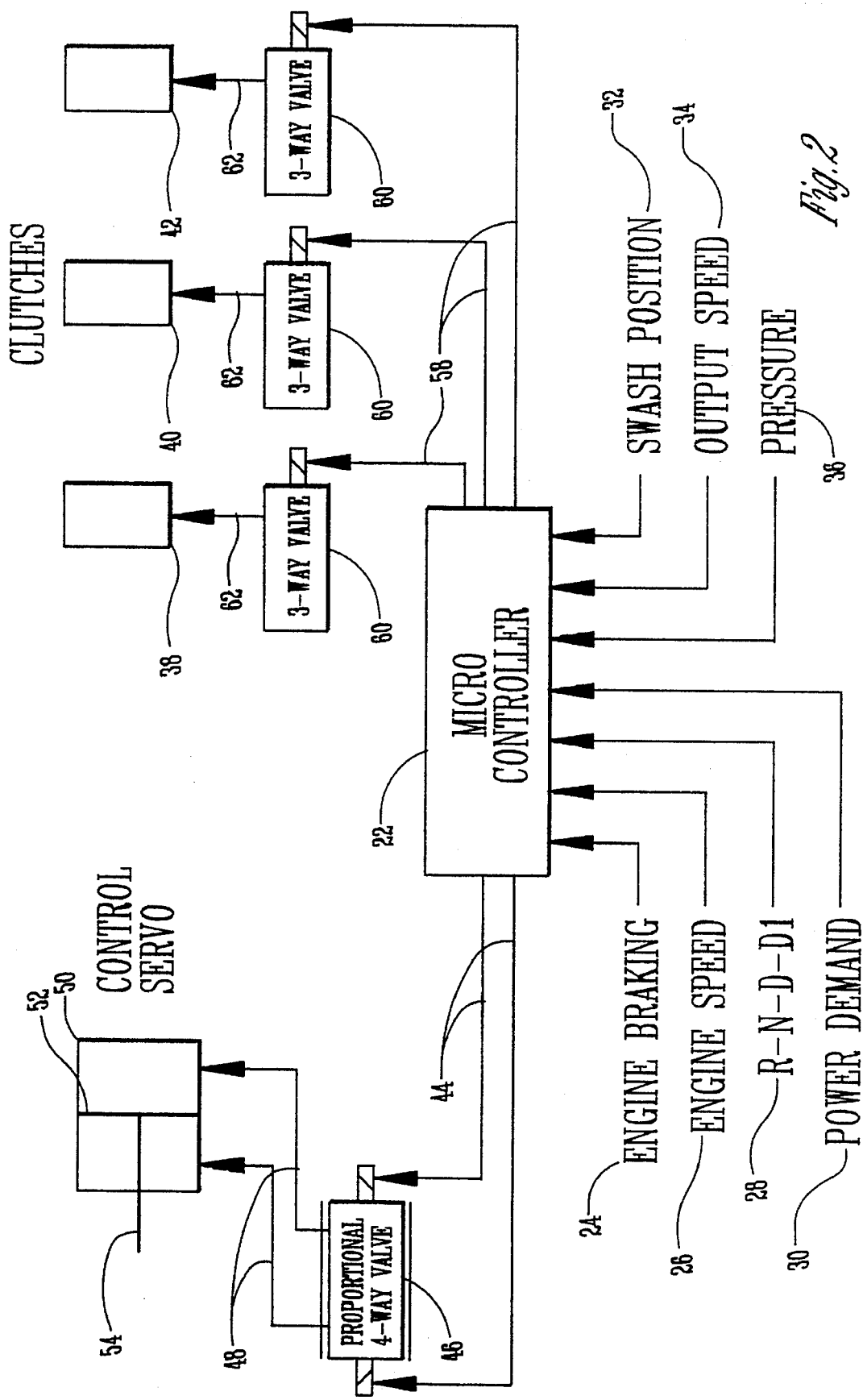
FIG. 2 is a block diagram of the transmission control system.

FIG. 2 shows a diagram of the transmission control system 10. A microcontroller 22 receives various signals from the vehicle system which includes the engine 12, the operator, the transmission 14, and the load 16. These signals include engine braking 24, engine speed 26, range select 28, power demand 30, swash position 32, output speed 34, and system pressure 36. To control the ratio of the input speed to the output speed, the microcontroller 22 manipulates the variable transmission swashplate position based on the various input signals. The microcontroller 22 also uses the signals to control a number of clutches. FIG. 2 shows three clutches (38, 40, and 42), but the microcontroller 22 could control any number of clutches.

The microcontroller 22 controls the transmission ratio in the following manner. As shown in FIG. 2, the microcontroller 22 sends a first set of control signals 44 to a proportional 4-way valve 46. The 4-way valve 46 functions to alternately pressurize and exhaust two working ports on the valve. The two ports are hydraulically connected to a pair of hydraulic lines 48 which are connected at their opposite ends to a control servo 50. The pump servo 50 has a piston 52 connected by a rod 54 to a movable swashplate of a conventional hydrostatic unit. The hydrostatic unit has an input shaft coupled to a prime mover such as engine 12 and an output shaft coupled to a load. The ratio of the speed of the input shaft to the output shaft is controlled by the position of the movable swashplate. As a result, the ratio of the input to output speed of the hydrostatic unit is controlled by the pressure applied to the piston 52 of the servo 50. The pressure applied to the piston 52 in turn is controlled by the proportional 4-way valve 46 which is controlled by the microcontroller 22. In this way, the microcontroller 22 is able to control the ratio of the hydrostatic unit.

The clutches (38, 40, & 42) are controlled by the microcontroller 22 in a similar manner. As shown in FIG. 2, the microcontroller 22 sends a second set of control signals 58 to three 3-way valves 60, each corresponding to a single clutch. The function of each 3-way valve 60 is to alternately pressurize and exhaust a working port which is connected by a hydraulic line 62 to a clutch. The hydraulic lines 62 in turn control the engagement and disengagement of the clutches 38, 40 & 42. In this way, the microcontroller 22 is able to control the clutches.

The control logic functions of the microcontroller 22 can be separated into two groups. The first group of functions are those that affect the power and speed. The second group of functions are those that affect the internal clutches.

Figure 3:
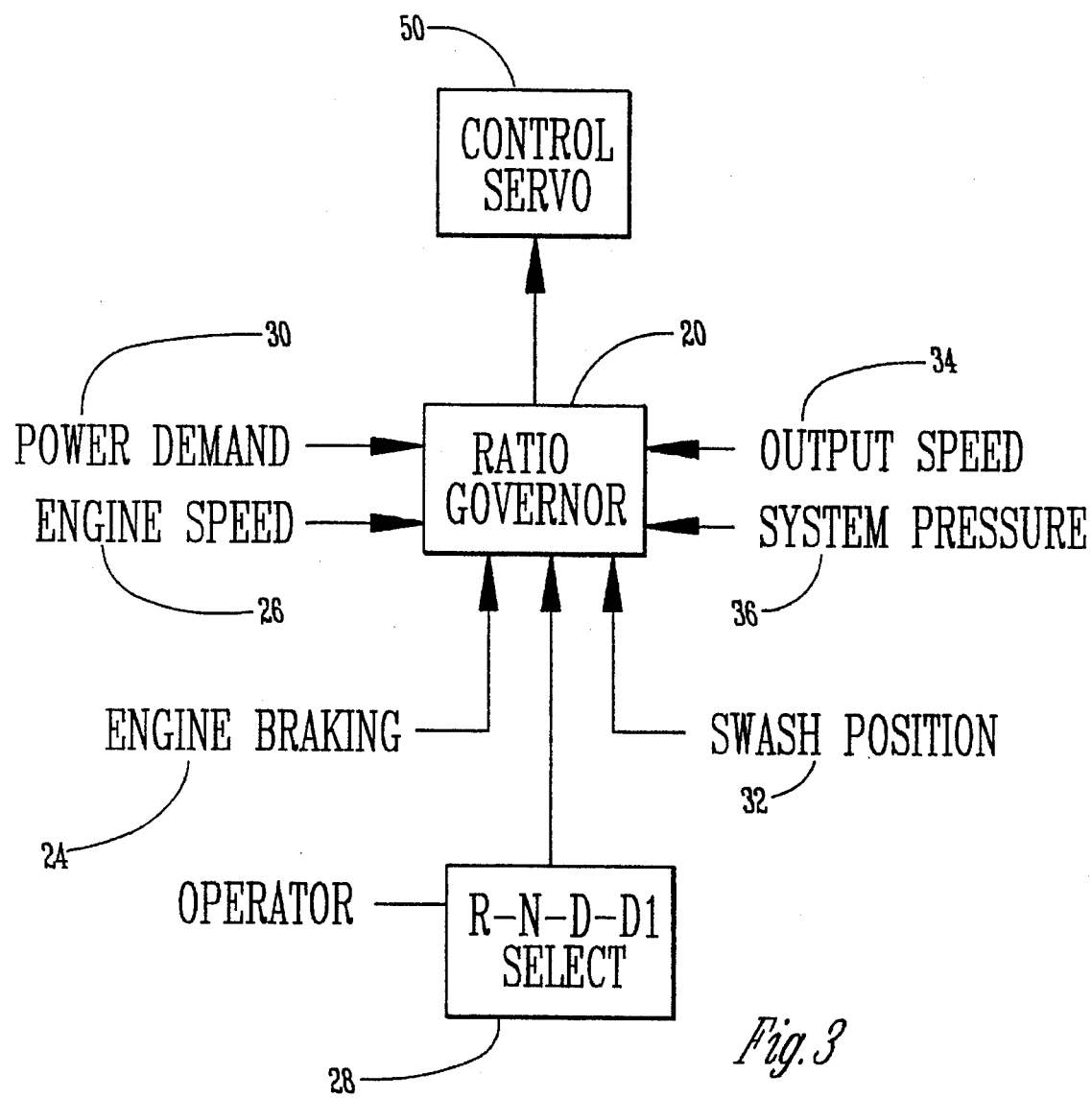
FIG. 3 is a block diagram of the ratio governor logic function.

FIG. 3 is a block diagram of the ratio governor logic function which affects the inputs and outputs of the transmission. The function of the ratio governor 20 is to control the ratio of the input speed to the output speed of the transmission 14. This is done by varying the position of the variable transmission swashplate.

Inputs to the ratio governor 20 include the drive range select 28 which is typically a four position switch controlled by the operator of the vehicle. The operator of the vehicle can select either of R, N, D, and D1 depending on the vehicle characteristics desired. For example, if the operator chooses the D1 position, the transmission ratio is limited to the lower part of the output speed range and raises the maximum system pressure (output torque) which is obtainable. The engine speed signal 26 (input) and output speed signal 34 are generated at the input and output shaft of the transmission. Preferably, the speed signals are generated using a pulse pick up with a magnetic sensor. One such pulse pick up is the KPP BLN 95-9045-1, manufactured by Sauer-Sundstrand, which accepts a supply voltage and in response to the speed of a magnetized ring, outputs a digital pulse signal. The power demand signal 30 is the operator command for engine power. This signal may be generated with a hall effect rotary position sensor connected to the engine fuel control or with a direct electrical connection if the engine of the vehicle is equipped with an electronic governor. One such rotary position sensor has a part number MCX 103B, D BLN-95-9040-1, manufactured by Sauer-Sundstrand, and can be connected to a control handle, foot pedal, throttle, etc. The system pressure signal 36 can be sensed with electronic transducers installed in the plus and minus working ports of the hydrostatic transmission 14. The swash position signal 32 is generated by a sensor integrated into the variable unit transmission structure. The rotary position sensor discussed above, or one similar to it could be used as the swash position sensor. The engine braking signal 24 is sensed in a similar manner.

As shown in FIG. 3, the ratio governer 20 receives various input signals from the control system including power demand 30, engine speed 26, output speed 34, system pressure 36, engine braking 24, swash position 32, and range select 28. The purpose of the ratio governor 20 is to position the swashplate according to the limiting operational characteristic of the vehicle system. The limiting operational characteristic may be one of several as follows. The first limiting operational characteristic is to limit engine speed and horse power during vehicle start up and at low ground speeds. Here, the engine speed would be controlled as a function of swash position and system pressure by limiting the amount of fuel delivered to the engine 12. This may be accomplished by a 2-way signal between the engine and transmission such as a network signal. A second limiting operational characteristic is to limit system pressure at low ground speeds to a maximum value. This is accomplished with a pressure measurement and a closed loop control which regulates the swash position in a pressure control mode. This limit may be adjustable or changeable with the mode selected by the operator. The third characteristic is to operate the engine on the locus of optimum fuel economy. This is accomplished by regulating the engine speed with the transmission ratio to a value which matches that for the selected engine power demand so only the required power is supplied. The fourth limiting operational characteristic is to control the maximum transmission output speed in order to limit the vehicle speed while maintaining a minimum fuel consumption or maximum efficiency, for example, while using a cruise control. This is accomplished with an output speed sensor and controller which overrides the power demand input to a value which matches the limiting output speed that the operator has selected. The fifth limiting operational characteristic is that under some conditions of operation, the engine speed may best be at a fixed speed in order to operate other functions independently of the continuously variable output. The sixth limiting operational characteristic is that the engine has braking capability which may be used to slow the vehicle during deceleration. During engine braking, the engine speed is raised without adding fuel by changing the input to output speed ratio of the continuously variable transmission.

As discussed above and shown in FIG. 2, the transmission ratio is set by the swash position which in turn is controlled by the proportional 4-way valve 46. The microcontroller 22 activates the 4-way valve 46 to set a ratio according to one of the above discussed limiting operational characteristics. The swash control algorithm may include a feedback of system pressure and swash position in order to stabilize the positioning and accuracy of the swashplate at high speeds.

During normal driving, the operator determines the power demand through use of the accelerator pedal. The power demand is adjusted by the operator to meet particular driving conditions or by the transmission when accelerating or cruising at a fixed highway speed. When braking with the engine, a pedal may be used to increase the engine speed without increasing fuel to provide engine retarding power. This pedal could be the normal brake pedal with a series connection to the conventional wheel brakes.

Figure 4:
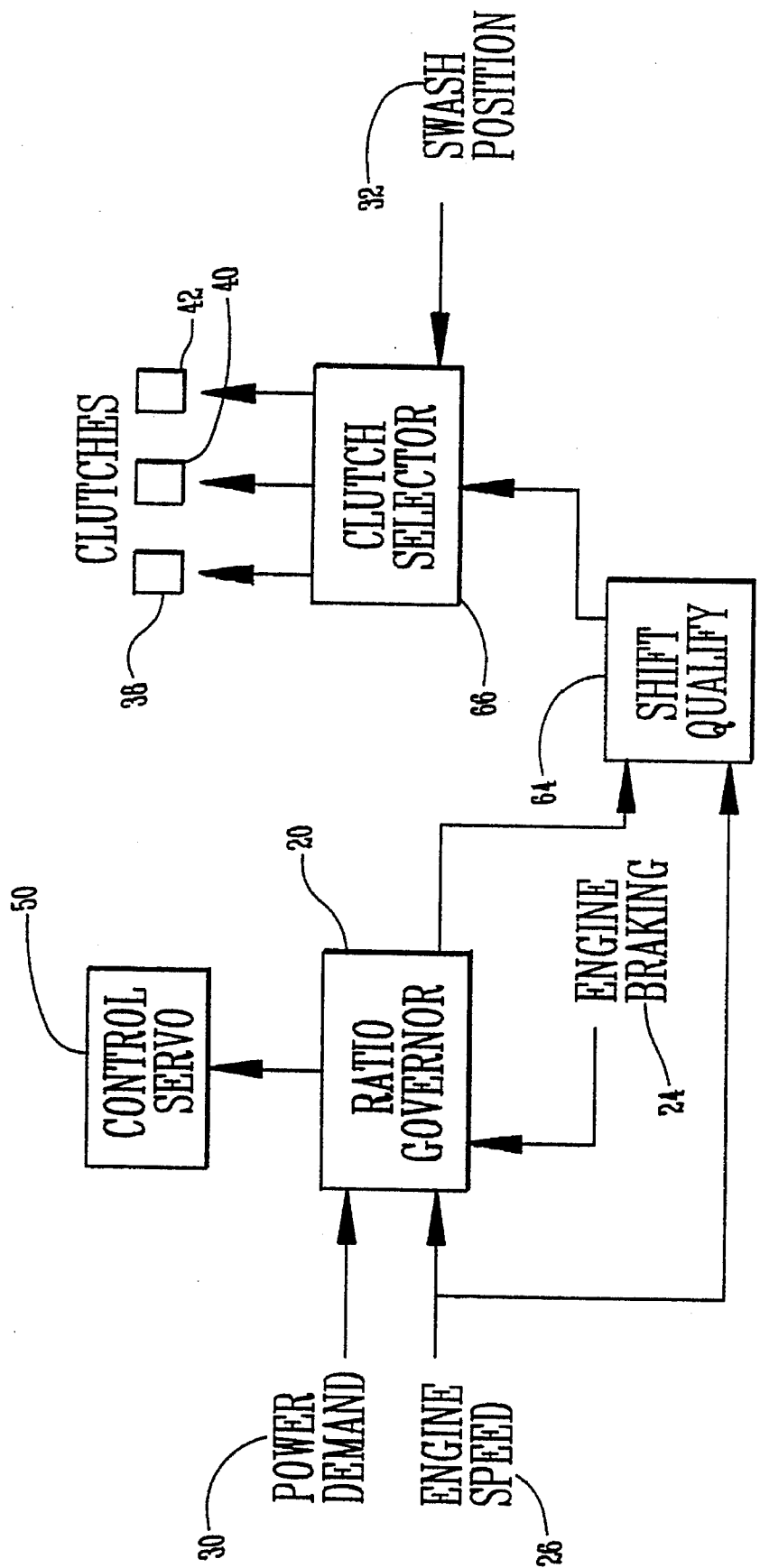
FIG. 4 is a block diagram of the shift select showing the inputs, outputs, and logic paths.

FIG. 4 shows a logic block diagram of the clutch select including inputs, outputs, and logic paths. The engine speed 26, power demand 30, and swash position 32 signals shown in FIG. 4 are the same as shown in FIG. 3 and described above. The ratio governor 20 is also the same as described above and shown in FIG. 3. FIG. 4 shows the clutch select for a three-mode hydromechanical transmission although the logic diagram applies to any number of modes.

The conventional swashplate of the hydrostatic transmission 14 is mounted for movement in two directions to either of two maximum displacement positions at either side of a neutral displacement position. As the vehicle speed changes, the position of the swashplate changes until it reaches one of the maximum displacement positions. At that time, a shift signal is initiated and a clutch selection is done so that the torque and speed range may be extended. The clutch selection process must be smooth and allow continuous ratio under conditions such as driving, braking, up shifting, and down shifting. The swash angle may be varied during a shift to improve the smoothness of the shift under different power conditions. Proper clutch selection depends on knowledge of the transmission ratio, engine speed, and engine power demand. The clutch sequencing preferably allows equal angle shifts.

As shown in FIG. 4, the shift qualify box 64 activates the clutch selector box 66 based upon the engine speed 26 and ratio governer 20 as follows. There are several qualifications required to initiate and complete a shift. First, up shifts must be qualified with a minimum engine speed in order to prevent nuisance reshifts at low power and low speed. Note that down shifts are not qualified. Second, up shifts must occur with engine speed equal to or above that required by the power demand signal. Similarly, on down sifts, the engine speed must be below the power demand signal. This requires a significant change in engine speed for reshifts, resulting in a hysterisis effect. This ensures that the power continues to flow in the desired direction. Note that this occurs when the swashplate reaches one of its maximum displacement positions whether driving or working. Third, the clutch must be actuated and released in the correct sequence. Fourth, a clutch release must be performed after a measured time period to allow for partial pressurization of the actuating clutch.

When the swash angle initiates a shift and the qualifying conditions are met, one clutch is pressurized and another is released. After the clutch switch, the power flow through the hydrostatic unit must reverse and the ratio governor must reverse the control logic to the variable transmission unit. This way the swashplate does not have to be moved to the opposite maximum displacement position after each shift. The transmission 14 then continues to change its ratio until the swashplate position reaches the maximum displacement position in the opposite direction and another shift signal is initiated. This shift sequence operates in a similar way during downshifting except that the sequence is reversed and the qualifiers are different. Both up shifts and down shifts are accommodated whether the vehicle is driving, coasting, or braking.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A hydromechanical transmission shifting control system for a vehicle system comprising:

an engine for powering the vehicle system;

a hydrostatic unit having an input member and an output member, said input and output members each having a speed at any given time;

said hydrostatic unit including a swashplate having a plurality of operating positions wherein the operating position of the swashplate determines the ratio of the output member speed to the input member speed;

a plurality of clutches operatively coupled to the hydrostatic unit, said clutches each having an engaged position and a disengaged position;

a plurality of sensors operatively coupled to the shifting control system for sensing a plurality of operating conditions including engine speed, power demand, and swashplate position; and a microcontroller operatively coupled to said sensors and said clutches for controlling the vehicle system by controlling the position of the swashplate, the engagement and disengagement of the plurality of clutches, and the engine speed based upon the plurality of operating conditions, wherein the microcontroller controls the vehicle system in such a way to compensate for various limiting characteristics of the vehicle system.

2. The hydromechanical transmission shifting control system of claim 1, further comprising a control servo operatively coupled between the swashplate and the microcontroller for controlling the position of the swashplate.

3. The hydromechanical transmission shifting control system of claim 2, further comprising a control valve hydraulically coupled to the control servo and electrically coupled to the microcontroller for controlling the control servo.

4. The hydromechanical transmission shifting control system of claim 3 wherein the control valve is comprised of a proportional 4-way valve.

5. The hydromechanical transmission shifting control system of claim 1, further comprising a plurality of clutch control valves, said clutch control valves each being hydraulically coupled to one of said clutches and electrically coupled to the microcontroller for controlling the engagement and disengagement of the plurality of clutches.

6. The hydromechanical transmission shifting control system of claim 5 wherein the clutch control valves are comprised of 3-way valves.

7. The hydromechanical transmission shifting control system of claim 1, wherein the plurality of sensors include an input member speed sensor and an output member speed sensor.

8. The hydromechanical transmission shifting control system of claim 1, wherein the plurality of sensors include at least one of a range select sensor, engine braking sensor, power demand sensor, swash position sensor, and pressure sensor.

9. The hydromechanical transmission shifting control system of claim 1, wherein said microcontroller limits the engine speed and engine output power to certain levels while the vehicle is operating at low ground speeds.

10. The hydromechanical transmission shifting control system of claim 9, wherein said engine speed is limited to a certain level by limiting the flow of fuel to the engine.

11. The hydromechanical transmission shifting control system of claim 1, wherein said microcontroller limits the hydrostatic unit pressure while the vehicle is operating at low ground speeds.

12. The hydromechanical transmission shifting control system of claim 1, wherein said microcontroller regulates the engine speed with the ratio of the output member speed to the input member speed to certain levels which match that for a user selected engine power demand.

13. The hydromechanical transmission shifting control system of claim 1 further comprising an output member speed sensor operatively coupled to the shifting control system for sensing the output member speed, wherein said microcontroller controls the system such that the maximum output member speed is controlled to limit the vehicle speed.

14. The hydromechanical transmission shifting control system of claim 1 further comprising a brake actuator operatively coupled to the microcontroller, wherein said microcontroller raises the engine speed by controlling the ratio of the output member speed to the input member speed when a user actuates the brake actuator.

15. A method of controlling a hydromechanical transmission system for a vehicle system comprising the steps of:

providing a hydrostatic unit having an input shaft and an output shaft;

providing an engine operatively coupled to said hydrostatic unit;

providing a plurality of clutches operatively coupled to the hydromechanical transmission, said clutches each having an engaged and disengaged position;

sensing a plurality of operating conditions of the vehicle system, said conditions including engine speed and power demand;

providing a microprocessor for receiving and processing the plurality of operating conditions;

regulating the ratio of the speed of the input shaft to the output shaft based upon the operating conditions of the vehicle system as received and processed by the microprocessor such that the ratio is optimal for a given set of operating conditions;

selectively controlling the engagement and disengagement of the plurality of clutches based upon the operating conditions of the vehicle system as received and processed by the microprocessor; and wherein the ratio is regulated and the engagement and disengagement of the plurality of clutches are controlled to compensate for various limiting characteristics of the vehicle system.

16. The method of claim 15 further comprising the step of limiting the engine speed and engine power while the vehicle system is operating at low ground speeds.

17. The method of claim 15 further comprising the step of limiting the pressure of the hydrostatic unit to a certain value while the vehicle system is traveling at low ground speeds.

18. The method of claim 15 further comprising the steps of:

sensing the output shaft speed; and controlling the output shaft speed in order to limit the vehicle speed.

19. The method of claim 15 further comprising the step of regulating the ratio and selectively controlling the clutches while maintaining a constant engine speed.

20. The method of claim 15 further comprising the step of regulating the ratio of the speed of the input shaft to the output shaft to increase the engine speed without additional fuel to slow down the ground speed of the vehicle system.

21. The method of claim 15 wherein the engagement and disengagement of the plurality of clutches is controlled such that an upshift is allowed only when the engine speed is greater than a certain value.

22. The method of claim 21 wherein the certain value depends on the power demand.

23. The method of claim 15 wherein the engagement and disengagement of the plurality of clutches is controlled such that a downshift is allowed only when the engine speed is less than a certain value and wherein said certain value depends on the power demand.

24. The method of claim 15 wherein the plurality of clutches are controlled such that the disengagement any of the clutches is initiated only after a measured period of time to allow for partial pressurization of an engaging clutch.

* * * * *